R. J. BURROUGHS.
BUILDER'S SQUARE.
APPLICATION FILED APR. 18, 1919.
1,323,742.  Patented Dec. 2, 1919.
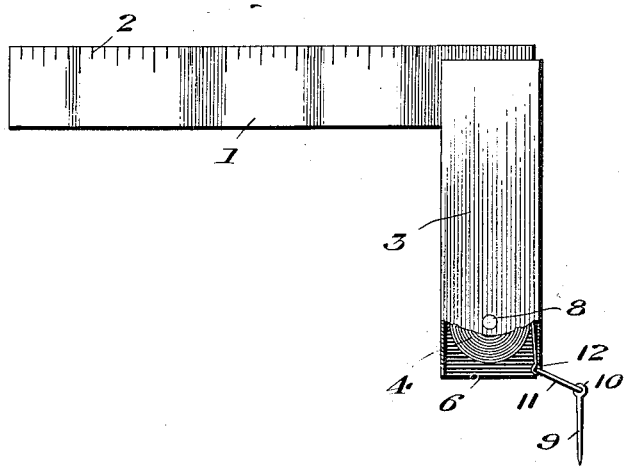
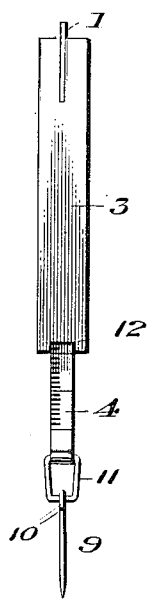
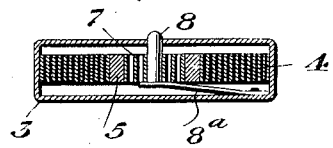
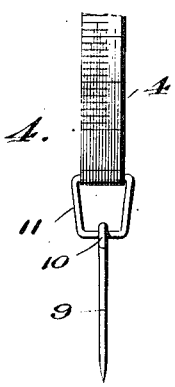
Witness
Wm C. Dashiell
Inventor
R. J. Burroughs
By H. J. Bernhard
Attorney

UNITED STATES PATENT OFFICE.

RYLAND JESSE BURROUGHS, OF RICHMOND, VIRGINIA.

BUILDER'S SQUARE.

1,323,742.   Specification of Letters Patent.   Patented Dec. 2, 1919.

Application filed April 18, 1919. Serial No. 291,005.

*To all whom it may concern:*

Be it known that I, RYLAND JESSE BURROUGHS, a citizen of the United States, residing at Richmond, in the county of Henrico and State of Virginia, have invented certain new and useful Improvements in Builders' Squares, of which the following is a specification.

This invention is a builder's square having for its object to provide for a plurality of measurements, one of which devices is capable of universal measurements when the square is maintained in a fixed position, said universal or flexible measuring device having means to indicate or mark the measured distance.

The invention embodies an ordinary builder's square having the usual fixed measurements on its blade, and in addition thereto there is provided a flexible measurement, positioned at a convenient point in the handle of the square, the flexible measurement being provided with a retaining and marking element, whereby the mechanic may fix his retaining element at a predetermined point to begin measurements and thereafter use the flexible measuring device to determine a second point of measurement, and while in its extended condition the square may be used for other measurements, or as a guide for indicating the cuts for lengths of timbers, and the like. The flexible measurement may be provided with retracting means for coiling the flexible measuring device within a small space to be housed within a suitable portion of the square.

Other objects of the invention and features of novelty will become apparent from the following detailed description of a preferred embodiment of the invention.

In the accompanying drawings,

Figure 1 is a side elevation of a square disclosing a plurality of measuring devices, a portion of the handle of the square being broken away to show the flexible measuring device coiled within the handle.

Fig. 2 is an end view of the square.

Fig. 3 is an enlarged detail view disclosing a means for coiling and retracting the flexible measurement.

Fig. 4 is a detail view of a retaining or marking device carried by the flexible measurement.

In the embodiment of the invention illustrated in the drawings, the carpenter's square may be of any desired construction or material, and is shown having a blade 1, provided with a fixed scale of measurements, indicated at 2, and a handle 3.

A flexible measurement 4 may be mounted at any suitable point on the handle 3, but in the drawings I have shown this flexible measure 4 as a tape measure wound upon a spool 5 with suitable retracting and winding mechanism, the whole of the flexible measurement being shown housed near one end 6 of the handle 3. The retracting mechanism may be of any preferred type, such as a coiled spring 7 for revolving the spool 5 in a direction the opposite to the movement of the spool necessary to draw out the tape measurement 4, so that the drawing out of the measure 4 will serve to place the spring 7 under tension, or store energy therein. The spool 5 may be provided with any suitable brake mechanism such as the spring blade 8ª to bear against the lower face of the drum to secure the spool against movement to thereby retain the tape measurement within the handle or permit it to remain extended the desired distance from the handle. It is preferred also to provide suitable mechanism, such as a button 8, shown protruding through the handle 3, to release the brake mechanism and permit the spring to retract the measure 4 within the handle when it is no longer desired for use.

At the free end of the flexible measurement 4 there may be provided a suitable retaining or marking device, one form of which is shown as a sharpened pin 9, mounted by an eye 10 to a loop 11, which loop may be pivotally mounted at an end of the measure 4.

In mounting the flexible measure within the handle, a slot 12 is shown provided at one corner of the handle for the passage of the measure 4, but the loop 11, being of greater diameter than the slot 12, does not enter the handle. The loop serves as a means for drawing out the measure 4 against the action of the spring 7.

In operation, the mechanic can begin a measurement by inserting the pin 9 into the material, using the end 6 of the handle to drive the pin, and thereafter move directly to the next desired position, as indicated by the measure 4, where the blade 1 and its scale 2 may be employed to indicate other marks of measurement or cuts, the hole made by the pin 9 serving as the first marking point. The tape measure 4 permits of measurements being made in a variety of directions while retaining the square in a fixed or predetermined position, as will be readily apparent to those skilled in the art, and thereby save the time of the mechanic over methods heretofore in use.

Having thus described my invention, what I claim as new and desire to secure by Letters Patent, is:

A builder's square provided with a fixed measurement and a flexible tape measurement, the latter adapted to be concealed within the handle of the square when not in use, a manually controlled spring-actuated retracting device for drawing the flexible measure within the handle, a loop at the free end of the flexible measuring device, and a retaining and marking device having an eye by which it is mounted on the loop for universal movement, which marking device is adapted to be driven into the material to be measured to thereby permit the square to be moved to a point remote from said driven retaining and marking device to effect other measurements and markings by the fixed measurement on the square.

In testimony whereof I affix my signature.

RYLAND JESSE BURROUGHS.